(12) United States Patent
Gatten (10) Patent No.: US 8,156,655 B2
(45) Date of Patent: Apr. 17, 2012

(54) PNEUMATICALLY POWERED POLE SAW

(76) Inventor: Ronald Gatten, Pleasanton, CA (US)

( * ) Notice: Subject to any disclaimer, the term of this patent is extended or adjusted under 35 U.S.C. 154(b) by 593 days.

(21) Appl. No.: 12/265,795

(22) Filed: Nov. 6, 2008

(65) Prior Publication Data

US 2009/0119935 A1 May 14, 2009

Related U.S. Application Data (60) Provisional application No. 60/986,865, filed on Nov. 9, 2007.

(51) Int. Cl.
*B23D 49/10* (2006.01)
*B27B 19/09* (2006.01)

(52) U.S. Cl. .......................................... 30/392; 173/114

(58) Field of Classification Search ............ 30/392–394; 173/114, 19
See application file for complete search history.

(56) References Cited

U.S. PATENT DOCUMENTS

| | | | | |
|---|---|---|---|---|
| 1,704,641 A | * | 3/1929 | Weed | 30/392 |
| 2,735,458 A | * | 2/1956 | Buchmann | 83/835 |
| 3,155,011 A | * | 11/1964 | Hyskell | 30/392 |
| 3,241,459 A | * | 3/1966 | Pirrello | 91/234 |
| 3,872,934 A | | 3/1975 | Terada | |
| 4,632,163 A | | 12/1986 | Fandrich | |
| 4,662,551 A | | 5/1987 | Dudley et al. | |
| 4,675,944 A | | 6/1987 | Wells | |
| 4,691,439 A | | 9/1987 | Marra | |
| 4,838,034 A | | 6/1989 | Leonard et al. | |
| 4,977,674 A | | 12/1990 | van der Merwe et al. | |
| 5,020,712 A | | 6/1991 | Monacelli | |
| 5,036,845 A | | 8/1991 | Scholley | |
| 5,084,975 A | * | 2/1992 | Melter | 30/249 |
| 5,127,399 A | | 7/1992 | Scholley | |
| 5,134,776 A | | 8/1992 | Moody | |
| 5,243,761 A | | 9/1993 | Sullivan et al. | |
| 5,253,554 A | | 10/1993 | Riera et al. | |
| 5,511,313 A | | 4/1996 | Yoder et al. | |
| 6,065,216 A | | 5/2000 | Izumisawa | |
| 6,065,373 A | | 5/2000 | Watanabe et al. | |
| 6,149,356 A | | 11/2000 | Chu et al. | |
| 6,268,077 B1 | | 7/2001 | Kelley et al. | |

(Continued)

OTHER PUBLICATIONS

International Search Report dated May 11, 2009 for International Application No. PCT/US2008/082551, International Filing Date Nov. 6, 2008.

(Continued)

*Primary Examiner* — Stephen Choi
(74) *Attorney, Agent, or Firm* — Cantor Colburn LLP (57) ABSTRACT

A pneumatically powered pole saw, comprising: an extendable pole; a head member secured to the extendable pole; a cutting blade movably mounted to the head member; a piston linked to the cutting blade; a reciprocating valve disposed in the head member configured to release compressed gas into the piston chamber on one side of the piston when the reciprocating valve is in a first position causing the cutting blade to move in a first cutting direction, when the cutting blade reaches the limit of travel in the first direction, the reciprocating valve releases compressed gas into the piston chamber on another side of the piston causing the cutting blade to move in a second cutting direction.

22 Claims, 10 Drawing Sheets

U.S. PATENT DOCUMENTS

| | | |
|---|---|---|
| 6,321,854 B1 | 11/2001 | Bisutti |
| 6,357,439 B1 | 3/2002 | Cook et al. |
| 6,415,876 B1 * | 7/2002 | Bollinger et al. ............. 173/135 |
| 6,488,050 B1 | 12/2002 | Jabcon |
| 6,658,745 B1 | 12/2003 | Huang |
| 6,932,128 B2 | 8/2005 | Turan, Jr. |
| 7,207,116 B2 * | 4/2007 | Nakamura ...................... 30/392 |
| 2002/0112356 A1 | 8/2002 | Bollinger et al. |
| 2004/0117993 A1 | 6/2004 | Armstrong |

OTHER PUBLICATIONS

Written Opinion of the International Searching Authority dated May 11, 2009 for International Application No. PCT/US2008/082551, International Filing Date Nov. 6, 2008.

Print out from http://www.mytoolstore.com/astro/astmat02.html dated Oct. 8, 2007, four pages.

Print out from http://news.mytoolstore.com/fullstory/23359 dated Oct. 8, 2007, 3 pages.

\* cited by examiner

FIG. 11B

PNEUMATICALLY POWERED POLE SAW

CROSS REFERENCE TO RELATED APPLICATIONS

This application claims the benefit of U.S. Provisional Patent Application Ser. No. 60/986,865 filed Nov. 9, 2007, the contents of which are incorporated herein by reference thereto.

BACKGROUND

Various embodiments of the present invention relate to a pneumatically powered pole saw.

Manually operated pole saws require an operator to manually push and pull a long pole back and forth in order to move a saw blade attached to the end of the pole, thereby cutting tree limbs with the attached saw blade. These pole saws rely entirely upon the operator force the necessary forces to be applied to the cutting blade or saw blade of the pole saw. Accordingly, and as the operator tires the efficiency of the cutting operation is reduced.

Accordingly, it is desirable to provide a powered pole saw having a means for efficiently converting stored energy into kinetic energy wherein the saw blade of the pole saw is actuated.

SUMMARY OF THE INVENTION

A pneumatically powered pole saw and method of operating is provided. Exemplary embodiments are directed to a pneumatically powered pole saw, comprising: an extendable pole; a head member secured to the extendable pole; a cutting blade movably mounted to the head member; a piston linked to the cutting blade, the piston being slidably received within a piston chamber of the head member; a reciprocating valve disposed in the head member, the reciprocating valve being configured for movement between a first position and a second position wherein the reciprocating valve releases a portion of a source of compressed gas into the piston chamber on one side of the piston when the reciprocating valve is in the first position causing the cutting blade to move in a first cutting direction towards a limit of travel in the first cutting direction and a first check valve provides fluid communication to the piston chamber on another side of the piston causing the reciprocating valve to move from the first position towards the second position, when the cutting blade reaches the limit of travel in the first direction, the reciprocating valve releases another portion of the source of compressed gas into the piston chamber on the another side of the piston when the reciprocating valve is in the second position causing the cutting blade to move in a second cutting direction opposite to the first cutting direction and towards a limit of travel in the second cutting direction and a second check valve provides fluid communication to the piston chamber on the one side of the piston, the reciprocating valve moving from the second position towards the first position when the cutting blade reaches a limit of travel in the second direction.

The above-described and other features are appreciated and understood by those skilled in the art from the following detailed description, drawings, and appended claims.

DETAILED DESCRIPTION OF EXEMPLARY EMBODIMENTS

In accordance with exemplary embodiments of the present invention, a pneumatically powered pole saw and method for operating the pole saw is disclosed. In an exemplary embodiment the pneumatically powered pole saw will comprise a source of compressed gas for use in driving the blade of the pole saw.

Referring now to FIGS. 1-5, a pneumatically powered pole saw 10 constructed in accordance with an exemplary embodiment of the present invention is illustrated. Pneumatically powered pole saw 10 has a cutting blade 12 movably mounted to a head member 14 of the pneumatically powered pole saw. Head member 14 further comprises a cylinder 16 configured to sildably receive a piston 18 therein. In accordance with an exemplary embodiment of the present invention piston 18 has at least one O-ring or sealing member that allows the piston to slide within the cylinder while also preventing or limiting fluid communication therethrough (e.g., maintaining or preventing fluids or gases on one side of the piston from passing around the piston to another side of the piston). Piston 18 is secured to a rod 20 that is secured to cutting blade 12 via a mount 22. Rod 20 passes through a sealed end of the housing wherein the rod is allowed to slide in and out without the release of the gases in the chamber through the opening the rod slides in. Mount 22 is configured to removably secure the cutting blade to the mount thus allowing removal and replacement of the cutting blade as it becomes worn, damaged or dulled. In one exemplary embodiment, the mount 22 has a pair of rollers 24 slidably received within a pair of complimentary channels or slots 26 disposed in a frame portion 28 of the head member. Rollers 24 allow the mount and the cutting blade to slide within a range of movement on the head member.

In one non-limiting exemplary embodiment, the head member further comprises a roller 30 rotatably mounted to the frame portion of the head member, the roller having a groove 32 configured to receive a non-toothed portion 34 of the cutting blade within the groove of the roller. Accordingly, roller 30 provides a means for supporting the cutting blade as it reciprocates within a range of motion on the head member.

Figure 4:
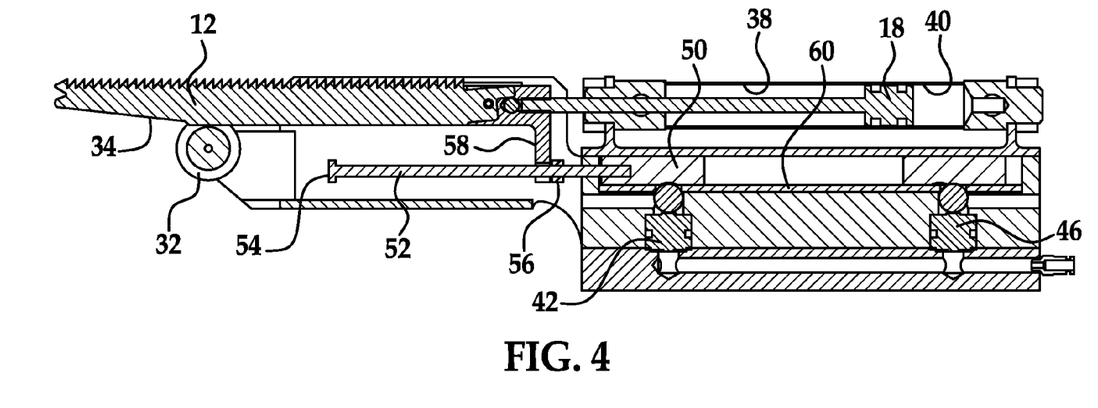
FIG. 4 is a cross-sectional view along lines 4-4 of FIG. 3.

In order to cause the cutting blade to traverse back and forth between a first position (e.g., cutting blade fully extended away from a distal end of the head member) and a second position (e.g., cutting blade fully retracted into the distal end of the head member) a source of compressed gas 36 is in selective fluid communication with a chamber (38, 40) at either side of the piston to cause movement of the piston in the chamber, wherein movement of the piston causes movement of the cutting blade by moving the rod and the mount. It being understood that size of chambers 38 and 40 vary accordingly with the movement of the piston 18. In one non-limiting exemplary embodiment, the source of compressed gas is self-contained reservoir of carbon dioxide. Of course, other suitable types of compressed gas are considered to be within the scope of exemplary embodiments of the present invention. In another exemplary embodiment, the source of compressed gas is provided by a reservoir fluidly coupled to a compressor 29, which may be a stand alone device or a wearable unit.

In order to provide fluid communication between the source of compressed gas and chamber 38 a first valve 42 is provided to allow selective fluid communication between the source of compress gas and chamber 38 via a conduit 44. First valve 42 is configured to allow fluid communication between the source of compressed gas and chamber 38 when the first valve is in an open position. Alternatively, and when the first valve is in a closed position chamber 38 is in fluid communication with atmosphere so that the gas in chamber 38 may be released to allow the cutting blade to travel to the first position. This is also provided by first valve 42 and conduit 44. Accordingly, and when the first valve is closed, chamber 38 via conduit 44 and first valve 42 allow the fluid in chamber 38 to be released into the atmosphere.

In order to provide fluid communication between the source of compressed gas and chamber 40 a second valve 46 is provided to allow selective fluid communication between the source of compress gas and chamber 40 via a conduit 48. Second valve 46 is configured to allow fluid communication between the source of compressed gas and chamber 40 when the second valve is in an open position. Alternatively, and when the second valve is in a closed position chamber 40 is in fluid communication with atmosphere so that the gas in chamber 40 may be released to allow the cutting blade to travel to the second position. This is also provided by second valve 46 and conduit 48. Accordingly, and when the second valve is closed, chamber 40 via conduit 48 and second valve 46 allow the fluid in chamber 40 to be released into the atmosphere.

In accordance with an exemplary embodiment of the present invention and in order to move the cutting blade to the first position the first valve is closed (e.g., gas vented from chamber 38) and the second valve is open (e.g., gas supplied from source to chamber 40). Similarly and in order to move the cutting blade to the second position the first valve is open (e.g., gas supplied from source to chamber 38) and the second valve is closed (e.g., gas vented from chamber 40).

In order to provide the opening and closing of valves 42 and 46 a slider 50 is movably received within head member 14 wherein movement of the slider causes the first valve and the second valve to open and close. In order to effect the movement of slider 50 a rod portion 52 of the slider has a pair of stops 54 and 56 wherein a portion 58 of the mount 22 is slidably received upon the rod portion 52. As the cutting blade traverses towards the first position the portion 58 will contact stop 54 and cause first valve 42 to open and second valve 46 to close thus, the cutting blade will then traverse towards the second position wherein the portion 58 will contact stop 56 and cause first valve 42 to close and second valve 46 to open thus, the cutting blade will then traverse towards the first position. This reciprocal movement of the cutting blade will continue until the source of gas is no longer fluidly coupled to the first valve and the second valve.

As illustrated in FIG. 4, the slider is slidably mounted above a cover plate 60 that is configured to allow slider 50 to open and close the first and second valves. Moreover, cover plate 60 is configured to prevent excessive wear from being caused by the reciprocal movement of the slider. In an alternative exemplary embodiment, the pneumatically powered pole saw is constructed without a cover plate (See FIGS. 5A-5D).

In order to provide fluid communication between the source of inlet or compressed gas 36 and the first valve and the second valve a control valve 62 is configured to provide fluid communication between the source of inlet or compressed gas 36 and the first valve and the second valve via conduits 64 between valve 42 and valve 46 and a conduit 68 between source of compressed gas 36 and control valve 62. In accordance with an exemplary embodiment of the present invention control valve 62 is in or proximate to head member 14 while conduit 68 extends to the source of compressed gas, which is disposed at an opposite end of a pole the head member is secured to.

Figure 5A:
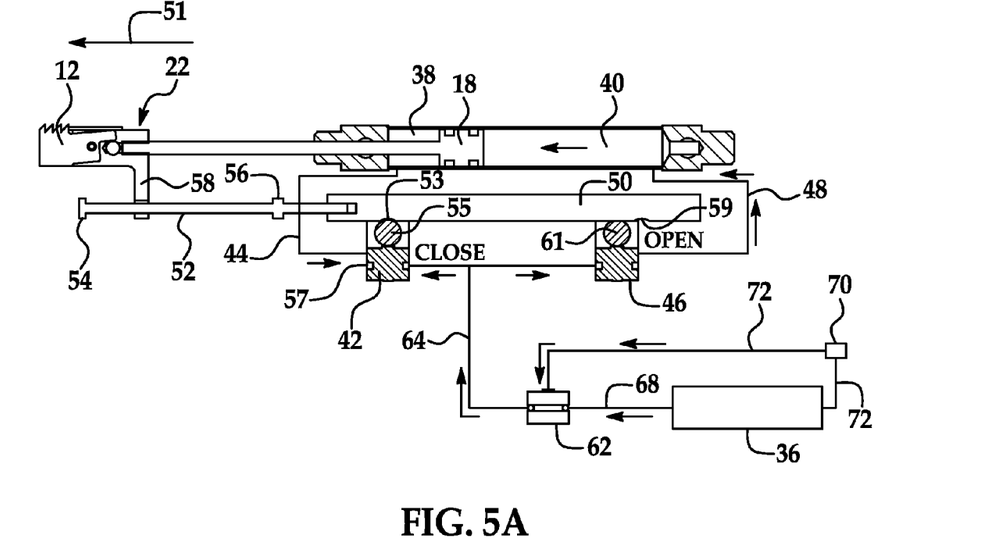
FIGS. 5A-5D are schematic illustrations of exemplary embodiments of the present invention.

Referring now to FIGS. 5A-5D operation of an exemplary embodiment of the present invention is illustrated. FIG. 5A illustrates the saw blade traveling in the direction of arrow 51. During this mode of operation and in the illustrated configuration of FIG. 5A valve 46 is open and compressed gas is being released into chamber 40 while the gas of chamber 38 is being released into the atmosphere from a vent of valve 42 thus piston 18 and the saw blade travel in the direction of arrow 51. It being understood that in order to effect movement in the direction of arrow 51 valve 42 is closed to conduit 64 while valve 46 is open to conduit 64 since a first feature 53 of the slider is positioned to receive a spring biased member 55 of valve 42 thus, causing conduit 64 to be closed to chamber 38 while chamber 38 is open to atmosphere via a vent 57 of valve 42.

In accordance with an exemplary embodiment of the present invention member 55 is biased generally into the direction of slider 50 such that when member 55 is received into feature 53 of slider 50 conduit 64 is closed to chamber 38 and vent 57 is open releasing the gas of chamber 38 while the saw blade travels in the direction of arrow 51.

Figure 5B:
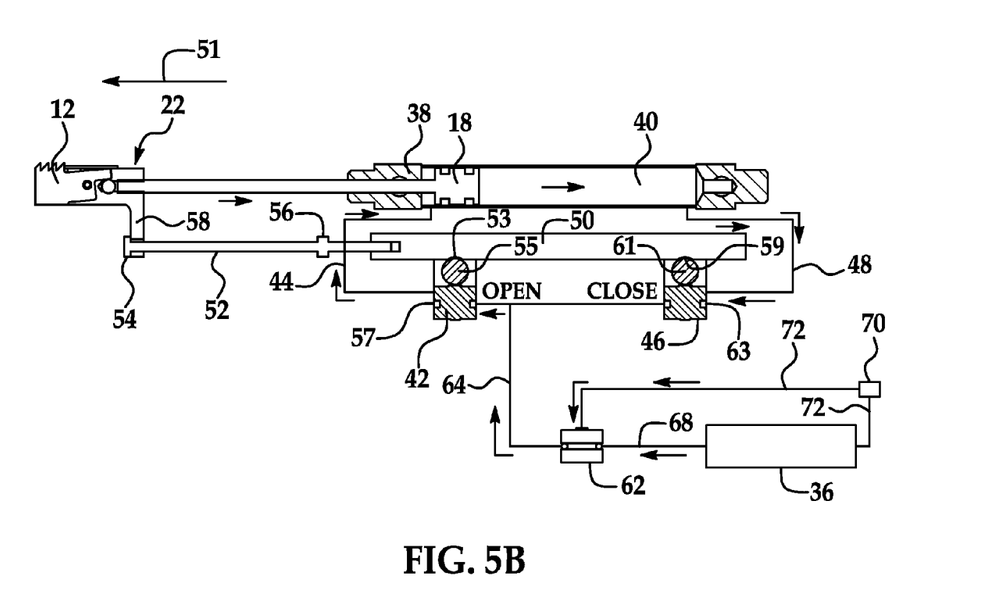
Figure 5C:
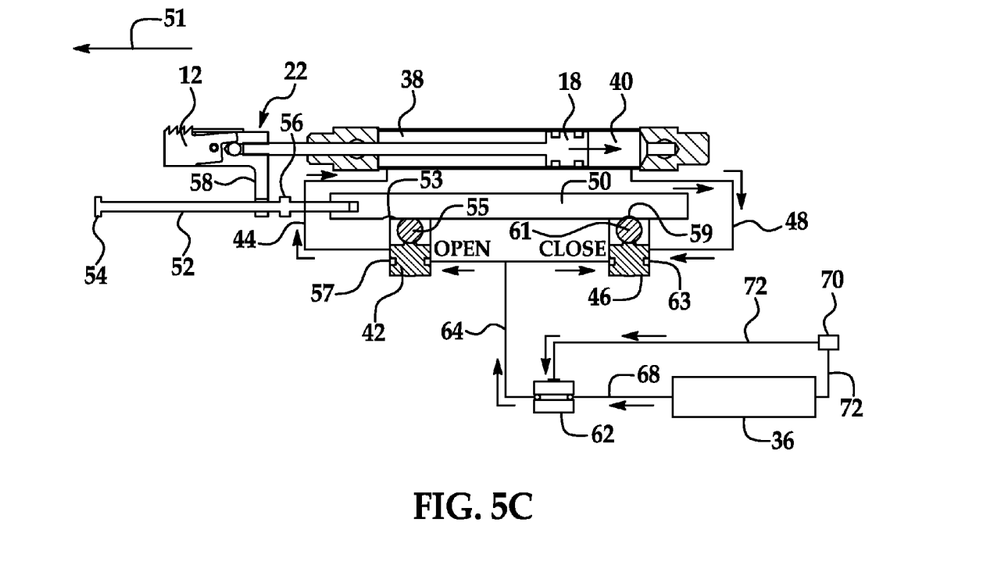
Figure 5D:
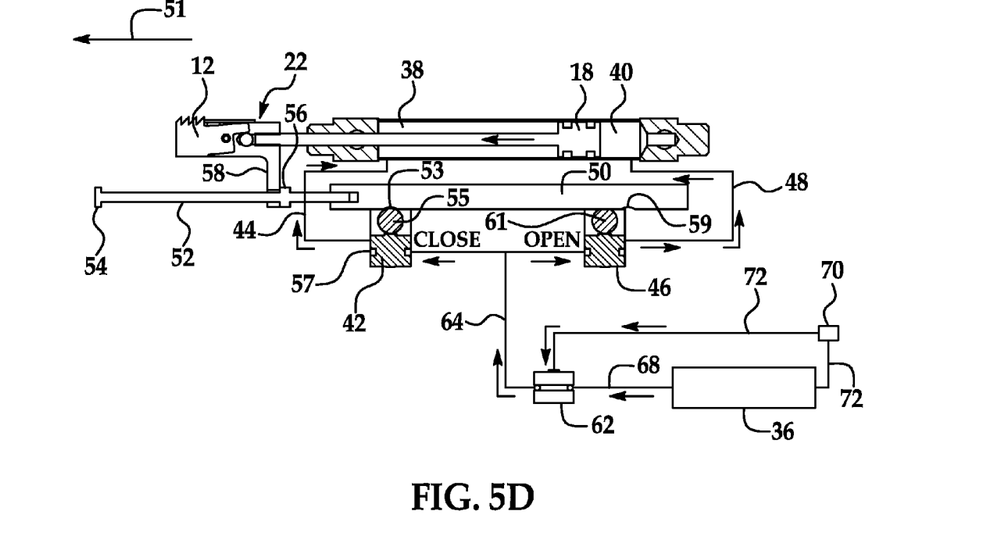

Movement of the saw blade in the direction of arrow 51 continues until portion 58 contacts stop 54 (FIG. 5B) causing the slider 50 to translate into the position of FIG. 5B wherein the feature 53 is no longer aligned with member 55 and the same is depressed into valve 42 causing conduit 64 to be in fluid communication with chamber 38 via valve 42 and conduit 44. At this position, the vent 57 of valve 42 is closed and the piston and saw blade will begin to travel in a direction opposite to arrow 51. Moreover, and at this position valve 46 is closed and the gas of chamber 40 is being released into the atmosphere from a vent of valve 46. It being understood that valve 46 is closed to conduit 64 while valve 42 is open to conduit 64 since a second feature 59 of the slider is no longer positioned to receive a spring biased member 61 of valve 46 thus, causing conduit 64 to be closed to chamber 40 while chamber 40 is open to atmosphere via a vent 63 of valve 46.

In accordance with an exemplary embodiment of the present invention member 61 is biased generally into the direction of slider 50 such that when member 61 is received into feature 59 of slider 50 conduit 64 is closed to chamber 40 and vent 63 is open releasing the gas of chamber 40 while the saw blade travels in the direction opposite of arrow 51. Conversely, and when member 61 is not received into feature 59 of slider 50 (FIG. 5A) conduit 64 is open to chamber 40 and vent 63 is closed and the saw blade and piston travel in the direction of arrow 51.

Movement of the saw blade in the direction opposite of arrow 51 continues (FIG. 5C) until portion 58 now contacts stop 56 (FIG. 5D) causing the slider 50 to translate back into the position of FIG. 5A wherein feature 53 is aligned with member 55 and feature 59 is not aligned with member 61 causing conduit 64 to be in fluid communication with chamber 40 via valve 46 and conduit 48. At this position, the vent 57 of valve 42 is open and the piston and saw blade will begin to travel in the direction of arrow 51. It being understood that valve 46 is open to conduit 64 while valve 42 is closed to conduit 64 since the second feature 59 of the slider is no longer positioned to receive spring biased member 61 of valve 46 thus, causing conduit 64 to be open to chamber 40 while chamber 38 is open to atmosphere via vent 57 of valve 42.

In accordance with an exemplary embodiment of the present invention, this reciprocal movement of saw blade 12, piston 18 and slider 50 will continue until the source of compressed gas released into conduit 64 by valve 62 ceases.

In accordance with an exemplary embodiment and by having the control valve at or proximate to the head member conservation of the gas supply is provided as conduit 68 will traverse through the pole which can be 20 feet or longer thus, and if the pole saw was required to fill or energize conduit 68 with gas each time the pneumatically powered pole saw was activated the source of compressed gas will be depleted quicker. Of course, the pole may be of any length (e.g., 10 feet or shorter, 8 feet or shorter, 6 feet or shorter, etc.). A non-limiting range for the length of the pole may be 5-25 feet. In accordance with an exemplary embodiment conduit 68 is filled with the gas and control valve 62 turns the saw on and off by limiting the amount of gas supplied via source of gas 36.

In one non-limiting exemplary embodiment, control valve 62 is an electro mechanical valve activated by a switch 70 disposed at an end of the pneumatically powered pole saw opposite from the cutting blade. In another non-limiting exemplary embodiment, control valve 62 is a pneumatically activated valve wherein a fluid conduit 72 provides fluid communication with the source of compressed gas and switch 70 allows fluid communication between valve 62 and source of compressed gas 36 wherein the compressed gas will open valve 62 and gas will be supplied to valves 42 and 46. In this embodiment, and in order to conserve the fluid supply of compressed gas 36 conduit 72 is much smaller than conduit 68 and thus only a small amount of gas is wasted each time valve 62 is opened. Furthermore, switch or valve 70 can be operated at a much lower pressure than the pressure passing through conduit 68 and is necessary to manipulate the movement of the piston within the cylinder.

Figure 6:
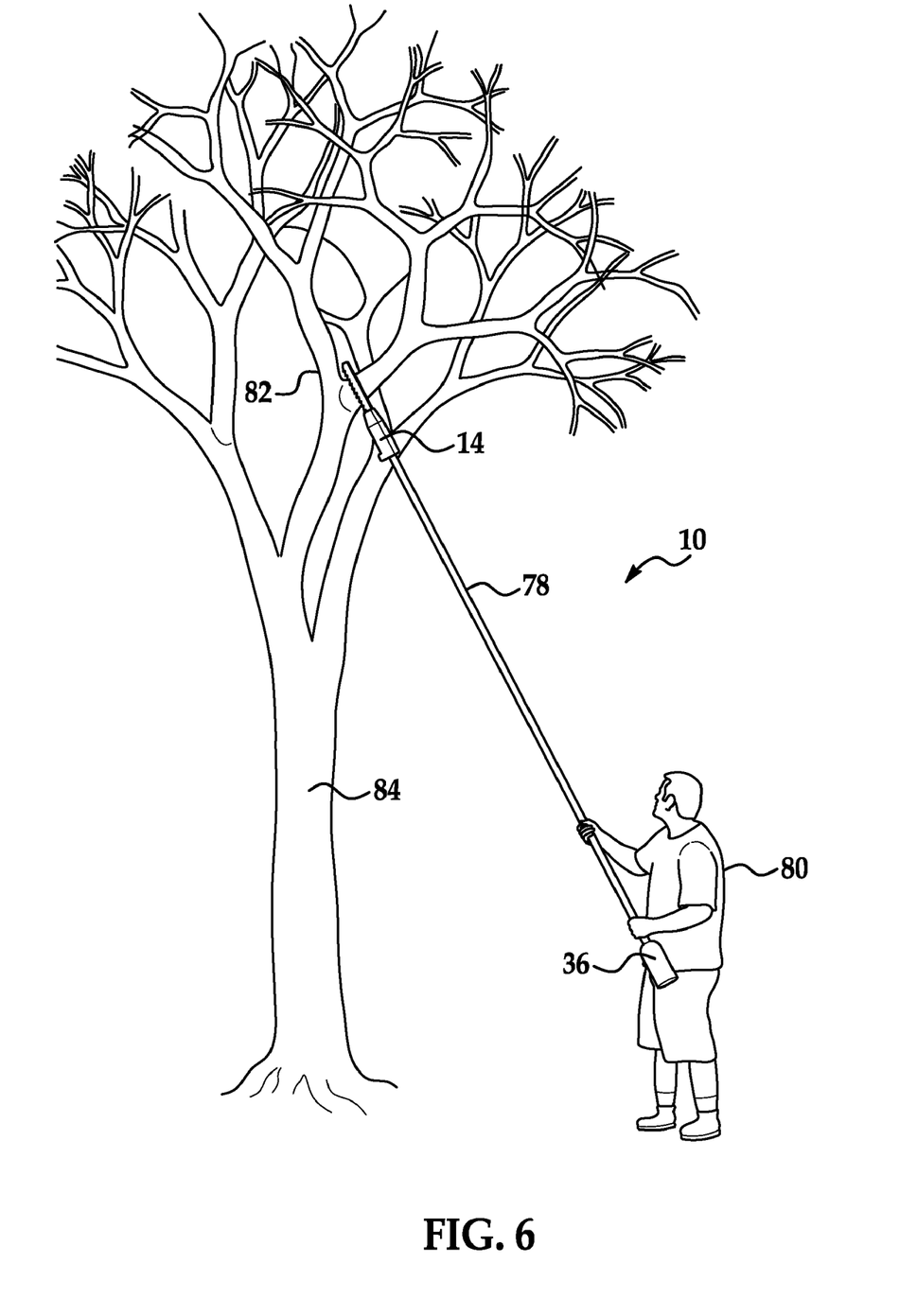
FIG. 6 is a view illustrating one exemplary embodiment of the present invention.

Referring now to FIG. 6 a pneumatically powered pole saw 10 constructed in accordance with an exemplary embodiment of the present invention is illustrated here a source of compressed gas 36 is a bottle secured to an end of a pole 78. In this embodiment, conduit 68 and/or conduit 72 traverse the length of pole 78 until they reach control valve 62, which disposed in or proximate to head portion 14. Thus, a user 80 activates the pneumatically powered pole saw by manipulating switch 70 and the saw is activated to cut a limb 82 of a tree 84. Once the desired task is completed, switch 70 is moved to an off position and the remaining gas is eventually released from the head member.

Figure 7:
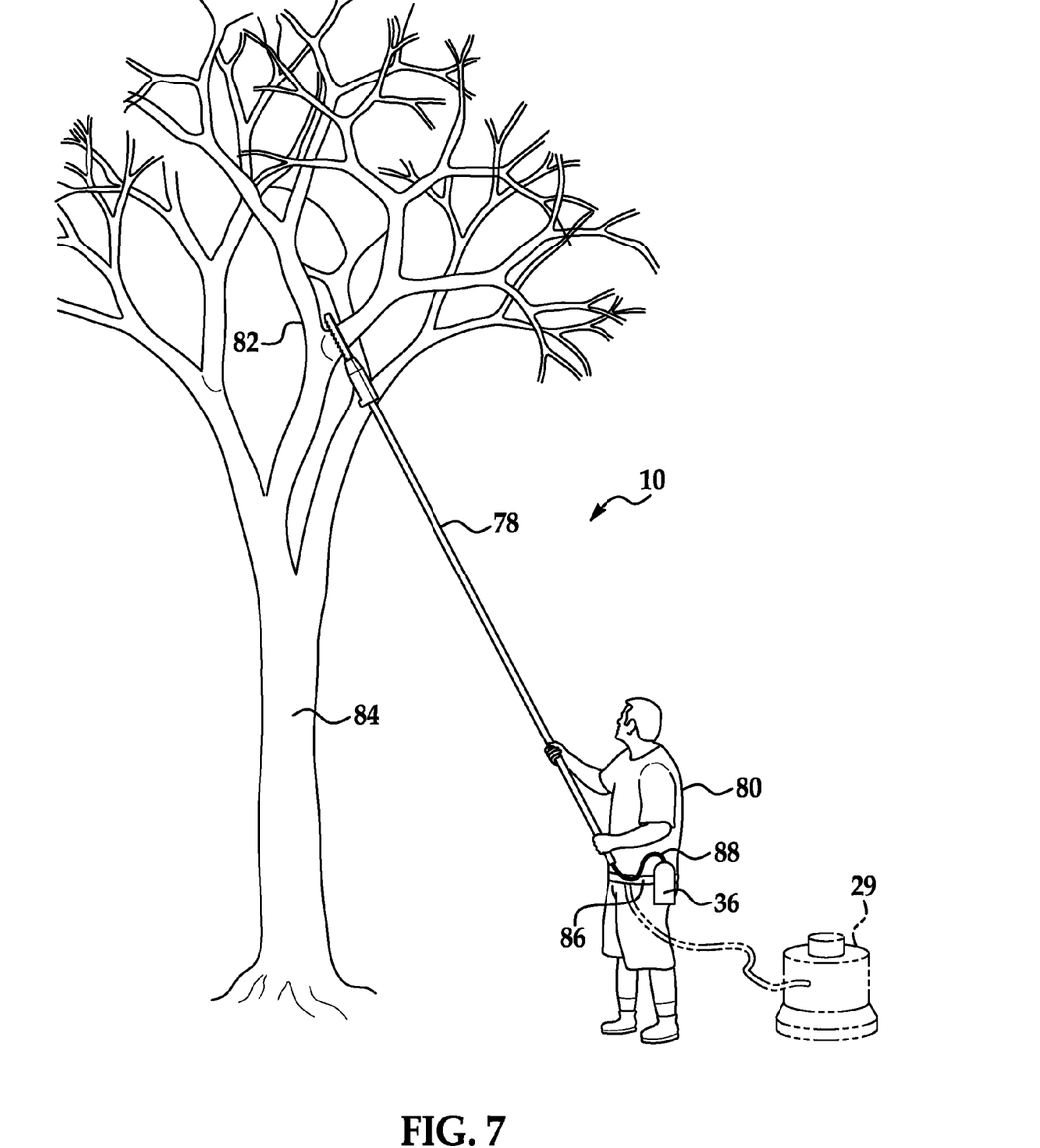
FIG. 7 is a view illustrating another exemplary embodiment of the present invention.
Figure 8:
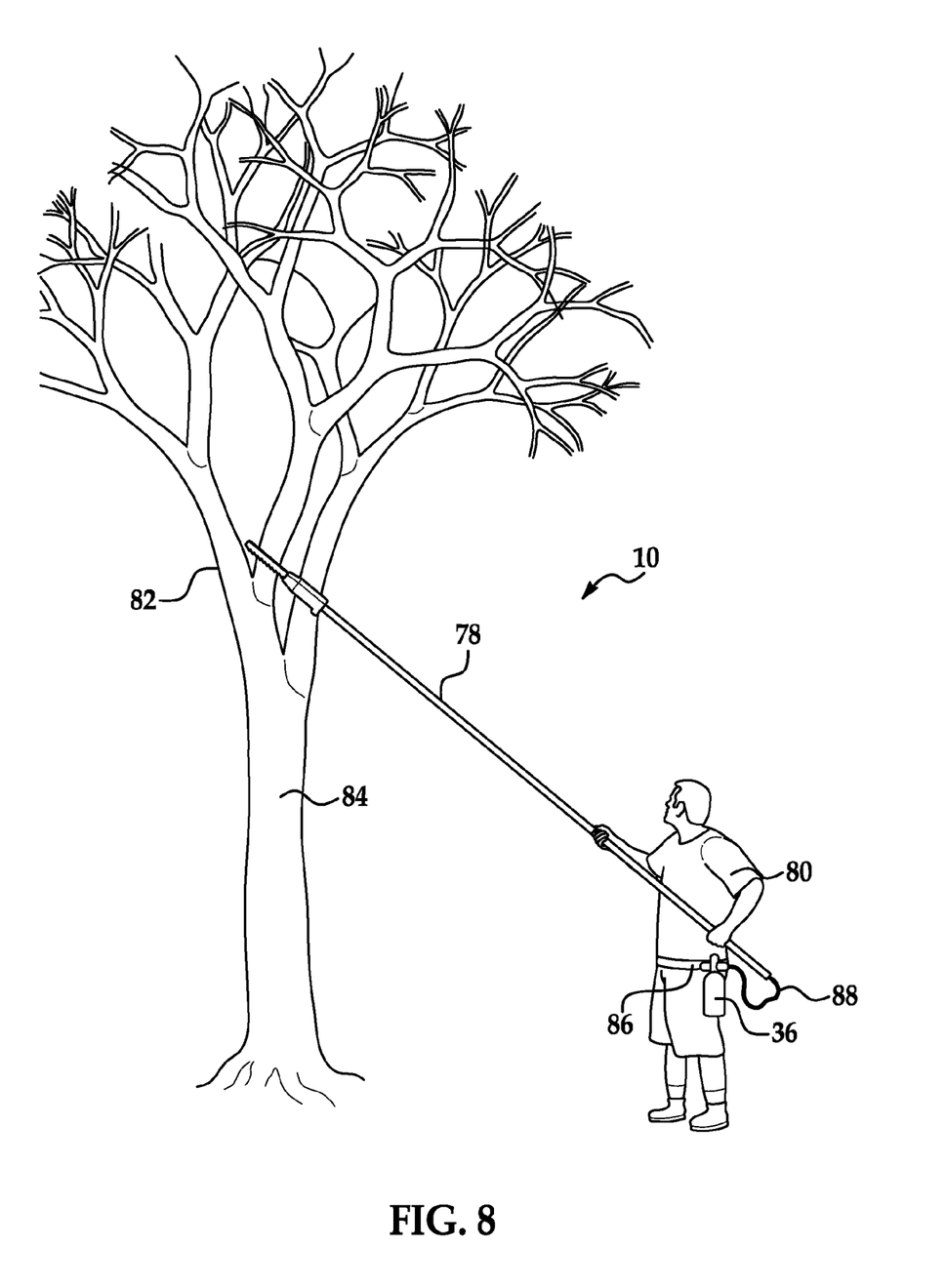
FIG. 8 is a view illustrating an exemplary embodiment of the present invention.

FIG. 7 illustrates an alternative exemplary embodiment, wherein the source of compressed gas 36 is secured to a wearable belt or harness 86 thus, the individual wears the compressed gas and the same is secured to the conduit 68 of the pole via a flexible conduit 88. Here the weight of the compressed gas is not on the end of the pole making the same easy to manipulate and use.

Figures 1, 1A:
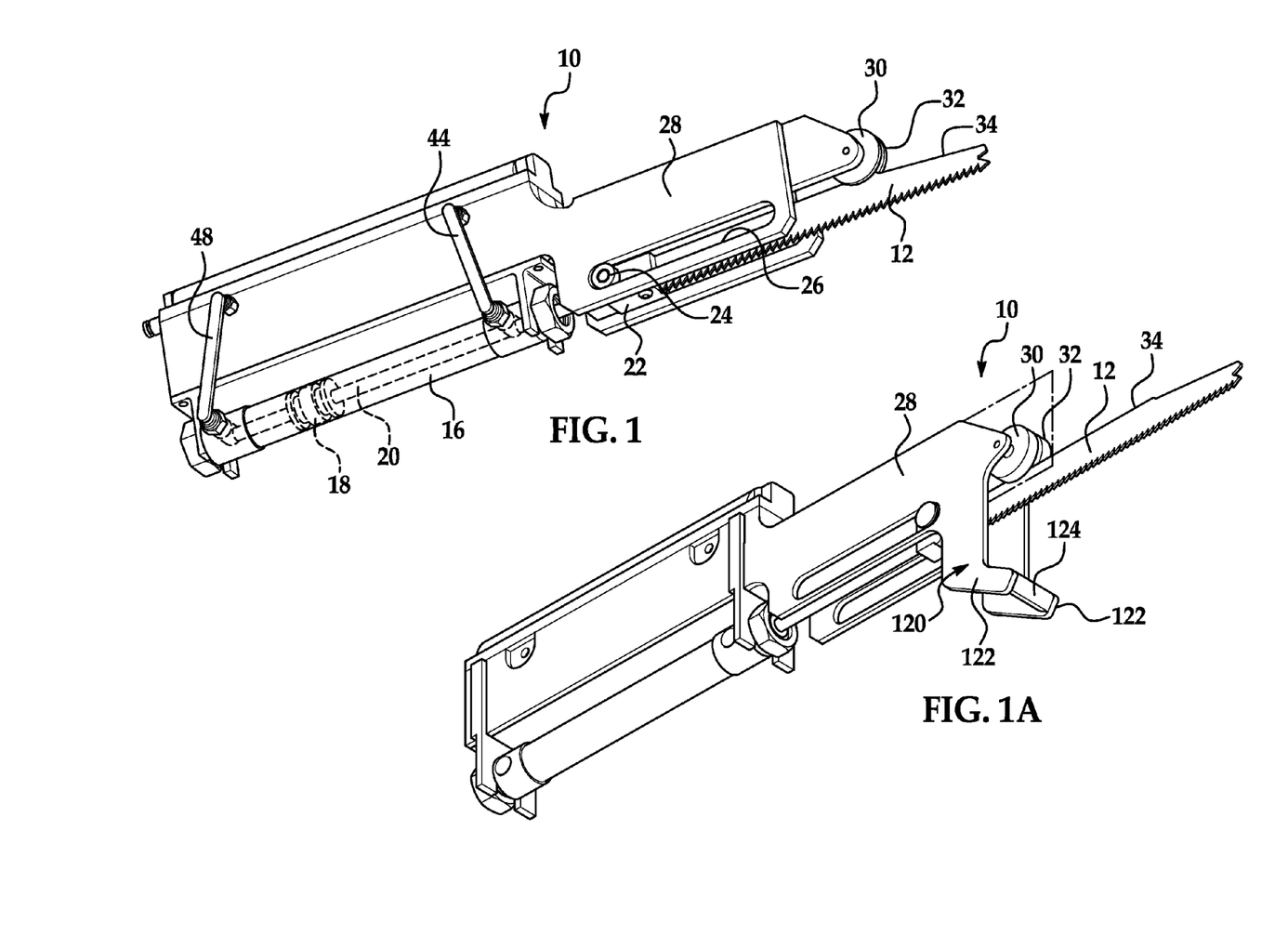
FIG. 1 is a perspective view of a pneumatically powered pole saw constructed in accordance with an exemplary embodiment of the present invention.
FIG. 1A is a perspective view of a pneumatically powered pole saw constructed in accordance with an alternative exemplary embodiment of the present invention.

Referring now to FIG. 1A an alternative exemplary embodiment of the present invention is illustrated. Here frame portion 28 further comprises a stop member 120. In an exemplary embodiment, stop member 120 has a pair of arms 122 and a cross member 124 that define a stop for limb that is being cut by the pole saw. For example, and as the blade is drawn towards the stop the teeth of the blade will engage the limb and apply a downward force to the limb which in turn may cause the head member to be drawn upward or in an opposite direction to the force being applied to the limb as the blade travels down towards the stop member. Accordingly, and in order to impart the cutting force to the limb in a downward stroke of the blade the stop member provides a surface to receive a portion of the limb on as the blade travels downward towards the stop member. Alternatively, and as illustrated by the dashed lines in FIG. 1A, the frame portion 28 is configured to extend past roller 30 and enclose the same within a portion of the frame portion so that limbs being cut or not being cut do not interfere with the movement of roller 32.

Figure 1B:
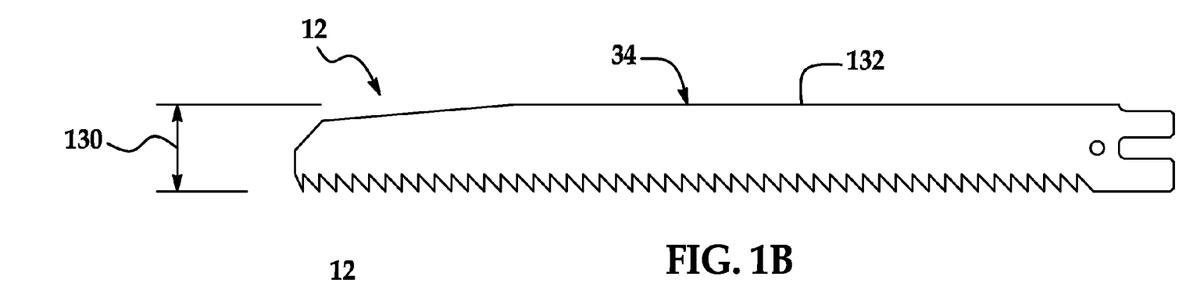
FIGS. 1B-D illustrate saw blades for use in various exemplary embodiments of the present invention.
Figure 1C:
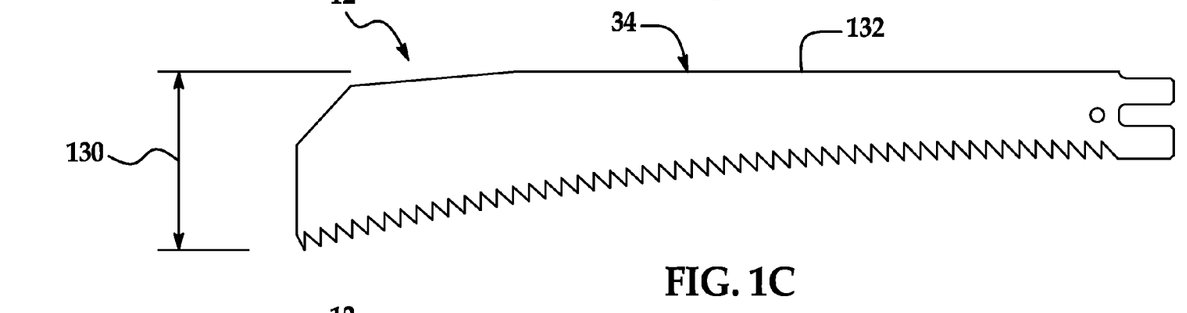
Figure 1D:
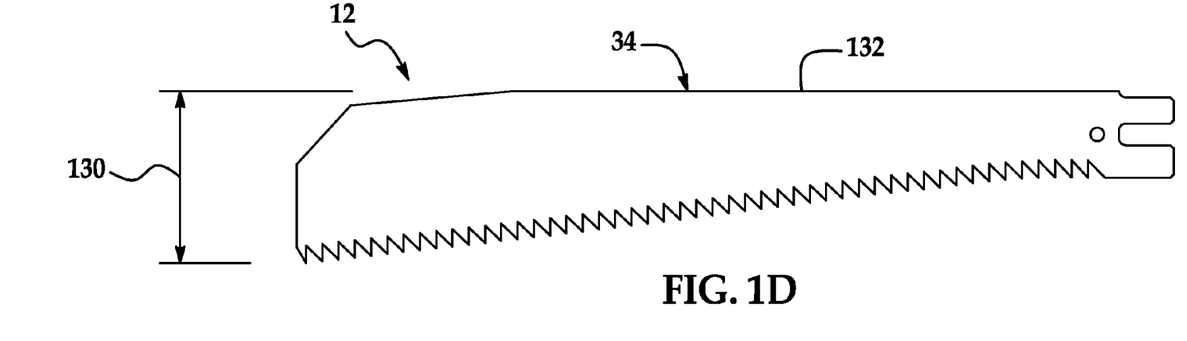
Figure 2:
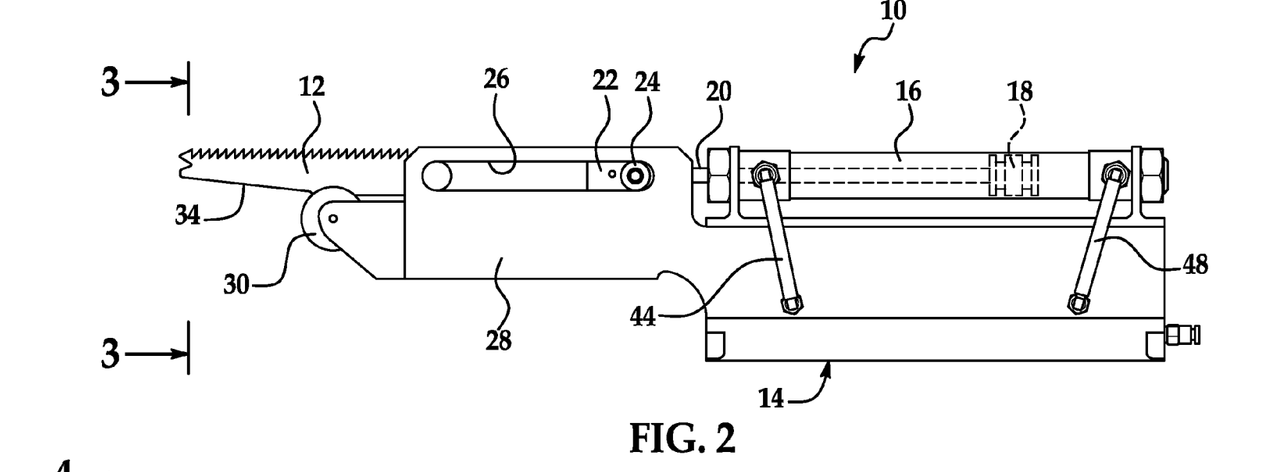
FIG. 2 is a side view of a pneumatically powered pole saw constructed in accordance with an exemplary embodiment of the present invention.
Figure 3:
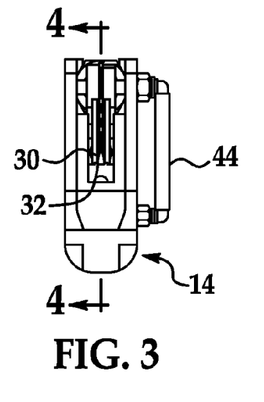
FIG. 3 is a view along lines 3-3 of FIG. 2.

Referring now to FIGS. 1B-1D alternative configurations of the saw blade are illustrated. FIG. 1B illustrates a straight saw blade wherein a width 130 of the blade from the non-toothed portion 34 and a toothed portion of the blade is essentially the same thickness along an edge 132 that is received within groove 32 of roller 30. Accordingly, and in this embodiment, the teeth of the blade generally act upon a cutting surface in a linear fashion.

Alternatively, and referring now to FIG. 1C, the width 130 of the blade from the non-toothed portion 34 and a toothed portion of the blade is not the same thickness along an edge 132 that is received within groove 32 of roller 30. Accordingly, and in this embodiment, the teeth of the blade generally act upon a cutting surface in a non-linear or curved fashion as the toothed surface also has a curved configuration.

In yet another alternative, and referring now to FIG. 1D, the width 130 of the blade from the non-toothed portion 34 and a toothed portion of the blade is not the same thickness along an edge 132 that is received within groove 32 of roller 30. Accordingly, and in this embodiment, the teeth of the blade generally act upon a cutting surface in a non-linear fashion as the saw blade is reciprocated within a range of motion and the teeth are acting upon a cutting surface.

In addition, and in accordance with one non-limiting exemplary embodiment of the present invention the stroke of the saw blade is approximately 4 inches which has been found to be suitable for tree limb cutting operations. Of course, strokes greater or less than 4 inches are considered to be within the scope of exemplary embodiments of the present invention.

In an alternative exemplary embodiment, the piston may be spring biased into one of the positions illustrated in FIGS. 5A-5D such that one of the valves 42 or 46 is open at an initial starting point and movement to the next position will be caused by the piston overcoming the spring force as well as the gas pressure on one side of the piston. In another exemplary embodiment, a spring biasing member may be positioned on either side of the piston wherein one spring biasing force is greater than the other to maintain one of the positions illustrated in FIGS. 5A-5D such that one of the valves 42 or 46 is open at an initial starting point.

Referring now to FIGS. 9A-11B, a pneumatically powered pole saw 10 constructed in accordance with an alternative embodiment of the present invention is illustrated. Here, referring to FIGS. 9B and 10B and in order to provide fluid communication between the source of compressed gas and chamber 40 a reciprocating valve 132 is provided to allow selective fluid communication between the source of compressed gas and chamber 40 via a conduit 134. In one non-limiting exemplary embodiment the reciprocating valve is a Humphrey Products TAC Valve (See FIGS. 10A and 10B). One non-limiting description of a Humphrey Valve is found in U.S. Pat. No. 6,488,050 the contents of which are incorporated herein by reference thereto. When the reciprocating valve is in a first position (See FIGS. 9B and 10B), a first outlet 136 of reciprocating valve is in fluid communication with a fluid inlet 138 of reciprocating valve which is in fluid communication with an inlet conduit 139 which is in fluid communication with the source of compressed gas to allow fluid communication between the source of compressed gas and chamber 40.

Figure 9A:
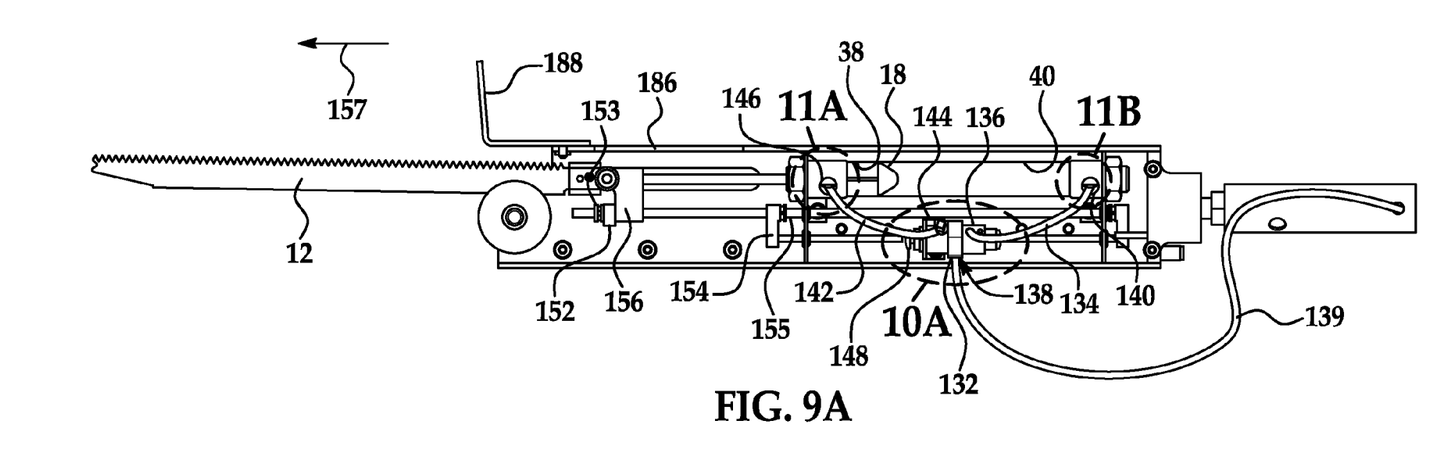
FIGS. 9A-9B are schematic illustrations of alternative embodiments of the present invention.
Figure 10A:
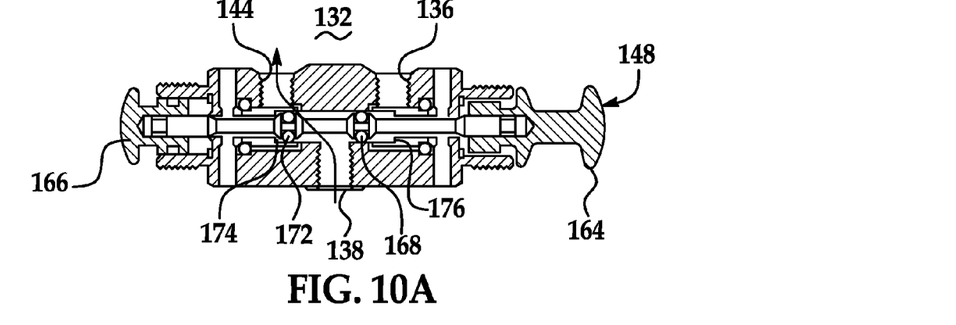
FIGS. 10A-10B are enlarged views of a reciprocating valve shown in FIGS. 9A-9B.
Figure 11A:
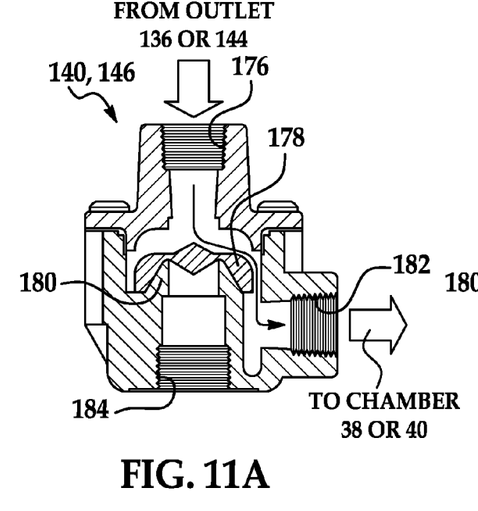
FIGS. 11A-11B are enlarged views showing operational positions of the check valves shown in FIGS. 9A-9B.

Alternatively, and as illustrated by the dashed lines in FIG. 9A as well as in FIGS. 10A and 11A, when the reciprocating valve is in a second position, the first outlet 136 restricts fluid communication between the source of compressed gas and chamber 40 and chamber 40 is in fluid communication with the atmosphere so that the gas in chamber 40 may be released via opening a first check valve 140 disposed on conduit 134 to allow the cutting blade to travel to the second position. In still another embodiment, the first check valve is disposed proximate to chamber 40. Accordingly, and when the reciprocating valve is in the second position, chamber 40 via first check valve 140 allows the fluid in chamber 40 to be released to the atmosphere.

Referring back to FIGS. 9A and 10A and in order to provide fluid communication between the source of compressed gas and chamber 38 a reciprocating valve 132 is provided to allow selective fluid communication between the source of compressed gas and chamber 38 via a conduit 142. When the reciprocating valve is in a second position (See FIGS. 9A and 10A), a second outlet 144 of reciprocating valve is in fluid communication with the fluid inlet 138 of reciprocating valve which is in fluid communication with the inlet conduit 139 which is in fluid communication with the source of compressed gas to allow fluid communication between the source of compressed gas and chamber 38.

Figure 9B:
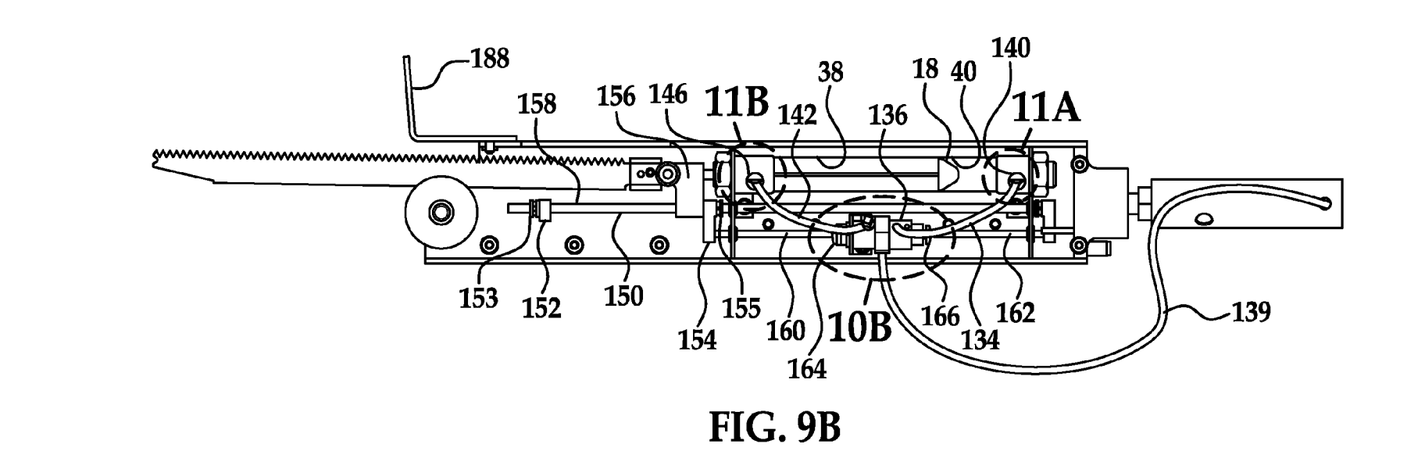
Figure 10B:
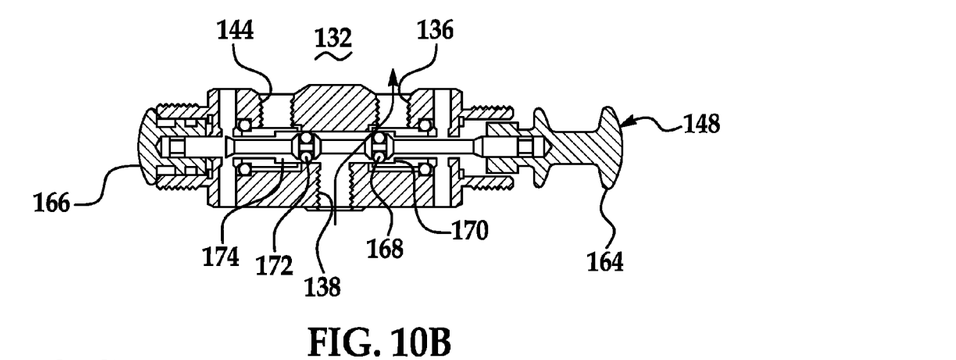
Figure 11B:
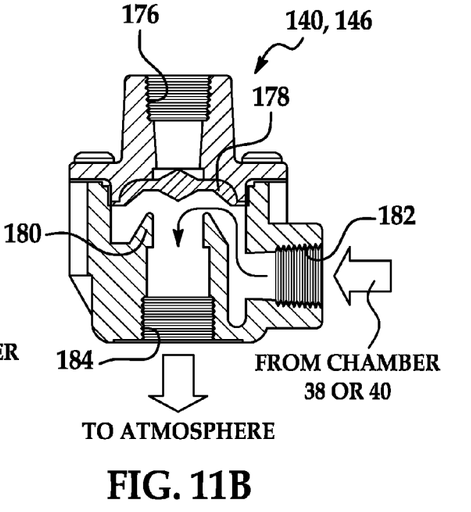

Alternatively, and as illustrated by the dashed lines in FIG. 9B as well as in FIGS. 10B and 11B, when the reciprocating valve is in a first position, the second outlet 144 restricts fluid communication between the source of compressed gas and chamber 38 and chamber 38 is in fluid communication with the atmosphere so that the gas in chamber 38 may be released via opening a second check valve 146 disposed on conduit 142 to allow the cutting blade to travel to the first position. In one non-limiting exemplary embodiment, the second check valve is disposed proximate to chamber 38. Accordingly, and when the reciprocating valve is in the first position, chamber 38 via second check valve 146 allows the fluid in chamber 38 to be released to the atmosphere.

In accordance with an alternative embodiment of the present invention and in order to move the cutting blade in the first cutting direction, the reciprocating valve 132 is in the first position (e.g. gas supplied from source to chamber 40) and the second check valve 146 is opened (e.g. gas vented from chamber 38). Similarly, and in order to move the cutting blade to the second cutting direction the reciprocating valve 132 is in the second position (e.g. gas supplied from source to chamber 40) and the first check valve 140 is opened (gas vented from chamber 40).

In order to provide the movement between the first and second positions of the reciprocating valve 132 an actuator 148 is disposed within the reciprocating valve wherein movement oft he actuator 148 causes the reciprocating valve to move between the first and second positions (See FIGS. 9A-10B). In order to effect the movement of the actuator an assembly 150 is slidably mounted in the head member. The assembly also has a pair of fixedly secured stops 152 and 154 wherein a portion 156 of the cutting blade is slidably received upon the assembly. As the cutting blade traverses in the first cutting direction the portion 156 of the cutting blade will contact stop 152 and cause the assembly 150 to move and contact the actuator causing movement of the reciprocating valve to the second position causing first check valve 140 to open thus, the cutting blade will then traverse in the second cutting direction wherein portion 156 will contact stop 154 and cause the assembly to move and contact the actuator causing movement oft he reciprocating valve to the first position causing second check valve to open thus, the cutting blade will then traverse to the first cutting position. This reciprocal movement of the cutting blade will continue until the source of gas is no longer fluidly coupled to the inlet 132 of the reciprocating valve.

As illustrated in FIGS. 9A and 9B, the assembly further comprises a main rod member 158 for slidably receiving the portion 156 of the cutting blade and a pair of contact members 160 and 162 each fixedly secured to the main rod member 158. Moreover, the actuator comprises a pair of contact sides 164 and 166 (See 10A and 10B) associated with the pair of contact members 160 and 162 wherein contact member 160 contacts contact side 164 when the portion 156 of cutting blade makes contact with stop 154 causing assembly to move in the second cutting direction, and similarly, contact member 162 contacts contact side 166 when the portion 156 of cutting blade makes contact with stop 152 causing assembly to move in the first cutting direction. It being understood that the pair of contact members 160 and 162 are not fixedly secured to the contact sides 164 and 166 oft he actuator such that when contact member 160 is in contact with contact side 164 a spaced relationship or gap exists between contact member 162 and contact side 166. Similarly, when contact member 162 is in contact with contact side 166 a spaced relationship or gap exists between contact member 160 and contact side 164.

In one non-limiting alternative embodiment of the present invention a pair of biasing members 153 and 155 disposed proximate to stops 152 and 154 provides portion 156 to be biased in the opposite direction when portion 156 makes contact with stop 152 or 154. It being understood that biasing members 153 and 155 are disposed on the side opposite to contact surface between portion 156 of and respective stop 152 or 154. Referring to FIG. 9A, when portion 156 makes contact with stop 152 assembly moves to the first cutting direction and portion 156 is subsequently biased to the second cutting direction due to the force provided by biasing member 153. Similarly, referring to FIG. 9B, when portion 156 makes contact with stop 154 assembly moves to the second cutting direction and portion 156 is subsequently biased to the first cutting direction due to the force provided by biasing member 155.

Referring to FIGS. 9A-11B operation of an alternative embodiment of the present invention is illustrated. It being understood that FIGS. 11A and 11B illustrate check valves 140 and 146 in a venting position (FIG. 11B) wherein the gas from the piston chambers 38, 40 moves the diaphragm 178 and in a supply position (FIG. 11A) wherein compressed gas is supplied via inlet 176 and the same moves the diaphragm 178 to cover the valve seat 180 and prevent fluid communication to outlet 184. In other words the configurations of valve 140 and 146 are similar thus, two figures are used to show the two positions of the two valves each being in selective fluid communication with either side of the piston chamber. It being further understood that outlets 184 of valves 140 and 146 are open to atmosphere to allow for unimpeded movement of the saw blade by the alternating supply of the compressed gas to the piston chambers at either side oft he movable piston. In accordance with an exemplary embodiment, the diaphragm 178 is constructed out of a resilient pliable material such as rubber or equivalents thereof such that the same can be moved by the gas from chambers 38 and 40 or the supply inlet 176. FIG. 9A illustrates the saw blade moved in the first cutting direction 157. During the traverse from the second cutting direction (opposite to arrow 157) to the first cutting direction reciprocating valve 132 is in the first position (See FIG. 10B) wherein second check valve 146 is open (FIG. 11B) thereby venting gas from chamber 38 to the atmosphere while first outlet 136 is in fluid communication with inlet 138 allowing fluid communication between the source of compressed gas and chamber 40 via check valve 140 (FIG. 11A) thus piston 19 and the saw blade travel in the first cutting direction. It being understood that in order to effect movement towards the first cutting direction the second outlet 144 is closed to conduit 142 and the first outlet is in fluid communication with conduit 134 since a first seal 168 is seated within a first seat 170 thereby opening first outlet 136 thus, causing conduit 134 to be in fluid communication with chamber 40. Similarly, a second seal 172 is unseated from a second seat 174 thereby sealing second outlet 144 thus, causing conduit 146 to be closed to chamber 38 while chamber 38 is open to atmosphere via second check valve 146 (FIG.

Referring now to FIGS. 9B and 11B, second check valve 146 is in an un-actuated position (FIG. 11B) configured to release gas from chamber 38 to the atmosphere when compressed gas is not entering through a conduit inlet 176 thereby causing a diaphragm 178 to not close against a valve seat 180 so that compressed gas from chamber 38 via piston passage 182 may vent directly to the atmosphere through an atmosphere outlet 184 instead of venting through the entire length of conduit 142. Moreover, the pressure caused by the piston travelling in the direction of arrow 157 from the position in FIG. 9B to the position in FIG. 9A causes the diaphragm 178 in valve 146 to move up to the position illustrated in FIG. 11B. This is particularly advantageous because allowing the compressed gas to vent from chamber 38 more quickly allows less back-pressure to retard the movement of the piston 18. Similarly, referring to FIGS. 9B and 11A and as the blade travels in a direction opposite to arrow 157, first check valve 140 is in an actuated position (FIG. 11A) configured to supply compressed gas to chamber 40 through the conduit inlet 176 thereby causing diaphragm 178 to close against valve seat 180 and diaphragm 178 has a peripheral configuration so that compressed gas may be supplied to chamber 40 via piston passage 182 and as illustrated by the arrows in FIG. 11A since the compressed gas forces the diaphragm against valve seat 180.

In one non-limiting alternative embodiment of the present invention first and second check valves 140, 146, are disposed proximate to chambers 40, 38, respectively, in order maintain the least amount of back pressure as possible between supplying and venting the compressed gas to chambers 38 and 40.

Referring now to FIGS. 9B and 10A movement of the saw blade in the second cutting direction opposite to arrow 157 is illustrated. During the traverse from the first cutting direction to the second cutting direction reciprocating valve 132 is in the second position (See FIG. 10A) wherein first check valve 140 is open (FIG. 11B e.g., no gas provided to inlet 176) thereby venting gas from chamber 40 to the atmosphere while second outlet 144 is in fluid communication with inlet 138 allowing fluid communication between the source of compressed gas and chamber 38 via valve 146 in the position illustrated in FIG. 11A thus piston 18 and the saw blade travel in the second cutting direction. It being understood that in order to effect movement towards the second cutting direction the first outlet 136 is closed to conduit 134 and the second outlet 144 is in fluid communication with conduit 142 since the second seal 172 is seated within the second seat 174 thereby opening second outlet 144 thus, causing conduit 142 to be in fluid communication with chamber 38. Similarly, the first seal 168 is unseated from the first seat 170 thereby sealing first outlet 136 thus, causing conduit 134 to be closed to chamber 40 while chamber 48 is open to atmosphere via first check valve 140.

Referring now to FIGS. 9A and 11B, and as the blade moves in the second cutting direction, first check valve 140 is in an un-actuated position configured to release gas from chamber 40 to the atmosphere when compressed gas is not entering through the conduit inlet 176 thereby causing the diaphragm 178 to not close against the valve seat 180 so that compressed gas from chamber 40 via piston passage 182 may vent directly to the atmosphere through an atmosphere outlet 184 instead of venting through the entire length of conduit 134. This is particularly advantageous because allowing the compressed gas to vent from chamber 40 more quickly allows less back-pressure to retard the movement of the piston 18. Similarly, referring to FIGS. 9A and 11A, second check valve 146 is in an actuated position configured to supply compressed gas to chamber 38 through the conduit inlet 176 thereby causing diaphragm 178 to close against valve seat 180 so that compressed gas may be supplied to chamber 38 via piston passage 182.

In accordance with an alternative embodiment of the present invention, this reciprocal movement of cutting blade 12, piston 18, reciprocating valve 132 and assembly 150 will continue until the source of compressed gas released into the inlet conduit 139 in fluid communication with inlet 138 of reciprocating valve ceases.

Referring now to FIGS. 9A and 9B an alternative embodiment of the present invention is illustrated. Here a frame portion 186 comprises a stop member 188 secured to the end of the frame and extending outward toward the end of the cutting blade 12. Stop member 188 defines a stop for a limb that is being cut by the pole saw. For example, and as the blade is drawn towards the stop the teeth of the blade will engage the limb and apply a downward force to the limb which in turn may cause the head member to be drawn upward or in an opposite direction to the force being applied to the limb as the blade travels down towards the stop member. Accordingly, and in order to impart the cutting force to the limb in a downward stroke of the blade the stop member provides a surface to receive a portion of the limb on as the blade travels downward towards the stop member.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A pneumatically powered pole saw, comprising:
an extendable pole;
a head member secured to the extendable pole;
a cutting blade movably mounted to the head member;
a piston linked to the cutting blade, the piston being slidably received within a piston chamber of the head member;
a reciprocating valve disposed in the head member, the reciprocating valve being configured for movement between a first position and a second position wherein the reciprocating valve releases a portion of a source of compressed gas into the piston chamber on one side of the piston when the reciprocating valve is in the first position causing the cutting blade to move in a first cutting direction towards a limit of travel in the first cutting direction and a first check valve provides fluid communication to the piston chamber on another side of the piston causing the reciprocating valve to move from the first position towards the second position, when the cutting blade reaches the limit of travel in the first direction, the reciprocating valve releases another portion of the source of compressed gas into the piston chamber on the another side of the piston when the reciprocating valve is in the second position causing the cutting blade to move in a second cutting direction opposite to the first cutting direction and towards a limit of travel in the second cutting direction and a second check valve provides fluid communication to the piston chamber on the one side of the piston, the reciprocating valve moving from the second position towards the first position when the cutting blade reaches a limit of travel in the second direction, wherein the reciprocating valve comprises an actuator on either side of the reciprocating valve and a portion of the cutting blade is slidably received on an assembly between a first stop member and a second stop member fixed to the assembly, the assembly being slidably mounted in the head member, wherein contact of the portion of the cutting blade with either the first stop member or the second stop member causes the assembly to move and contact the actuator on either side of the reciprocating valve moving the reciprocating valve between the first position and the second position.

2. The pneumatically powered pole saw as in claim 1, wherein the assembly further comprises a main rod member for slidably receiving the portion of the cutting blade and a pair of contact members each fixedly secured to the main rod member, each one of the pair of contact members being configured to contact one of the actuators as the portion of the blade contacts either the first stop member or the second stop member and wherein the pair of contact members are not fixedly secured to the actuators such that an end portion of each of the pair of contact members is in a spaced relationship with respect to one of the actuators when the portion of the blade makes contact with either the first stop member or the second stop member.

3. The pneumatically powered pole saw as in claim 1, wherein the assembly opens either the first check valve or the second check valve as the cutting blade contacts the first stop member and the second stop member.

4. The pneumatically powered pole saw as in claim 3, wherein the assembly, the reciprocating valve, the first check valve and the second check valve are located in the head member.

5. The pneumatically powered pole saw as in claim 1, wherein the source of compressed gas is secured to the extendable pole at a position remote from the head member.

6. The pneumatically powered pole saw as in claim 1, wherein the reciprocating valve is a slide valve coupled to the cutting blade and movement of the cutting blade actuates the slide valve.

7. The pneumatically powered pole saw as in claim 6, wherein the slide valve comprises a slide coupled to the cutting blade and a first valve for releasing the source of compressed gas into one side of the piston chamber and a second valve for releasing the source of compressed gas into another side of the piston chamber, wherein movement of the slide between a first position and a second position alternately opens and closes the first valve and the second valve respectively.

8. The pneumatically powered pole saw as in claim 7, wherein a portion of the cutting blade is slidably received on the slide and the slide is moved between the first position and the second position when the cutting blade contacts a pair of stops on the slide.

9. The pneumatically powered pole saw as in claim 7, wherein the first valve releases the source of compressed gas into one side of the piston chamber when a spring biased member of the first valve is depressed into the first valve by the slide and a vent of the second valve allows gas to exit another side of the piston chamber when a spring biased member of the second valve is received into one of a pair of features of the slide and the second valve releases the source of compressed gas into the another side of the piston chamber when a spring biased member of the second valve is depressed into the second valve by the slide and a vent of the first valve allows gas to exit the one side of the piston chamber when a spring biased member of the first valve is received into the other one of the pair of features of the slide.

10. The pneumatically powered pole saw as in claim 1, wherein the source of compressed gas is secured to a wearable harness.

11. The pneumatically powered pole saw as in claim 1, further comprising: a first fluid conduit providing fluid communication between the source of compressed gas and the reciprocating valve and the first fluid conduit has a valve for releasing the compressed gas into the first fluid conduit.

12. The pneumatically powered pole saw as in claim 11, wherein the valve is actuated by a switch disposed on the extendable pole.

13. The pneumatically powered pole saw as in claim 11, further comprising a second fluid conduit for providing fluid communication between the source of compressed gas and the valve, the first fluid conduit being larger than the second fluid conduit and the valve is actuated by a switch proximate to the source of compressed gas, the switch releasing a portion of the compressed gas into the second fluid conduit to actuate the valve.

14. The pneumatically powered pole saw as in claim 1, wherein the cutting blade is positioned at one end of the extendable pole and the source of compressed gas is located at the other end of the extendable pole.

15. The pneumatically powered pole saw as in claim 1, wherein a plurality of teeth of the cutting blade are angled towards the head member.

16. The pneumatically powered pole saw as in claim 1, wherein the cutting blade has a variable thickness.

17. The pneumatically powered pole saw as in claim 16, further comprising a roller for guiding the cutting blade and a stop member is positioned proximate to the roller, the stop member being configured to prevent a branch being cut by the pneumatically powered pole saw from contacting the roller.

18. The pneumatically powered pole saw as in claim 1, further comprising a roller for guiding the cutting blade and a stop member is positioned proximate to the roller, the stop member being configured to prevent a branch being cut by the pneumatically powered pole saw from contacting the roller.

19. The pneumatically powered pole saw as in claim 1, wherein the reciprocating valve is a slide valve coupled to the cutting blade and movement of the cutting blade actuates the slide valve, the slide valve being coupled to the cutting blade and movement of the cutting blade actuates a slide coupled to the cutting blade and a first valve for releasing the source of compressed gas into one side of the piston chamber and a second valve for releasing the source of compressed gas into another side of the piston chamber and the first valve and the second valve are alternately opened and closed by movement of the slide between a first position and a second position.

20. The pneumatically powered pole saw as in claim 1, further comprising a roller mounted to the head member for guiding the cutting blade.

21. The pneumatically powered pole saw as in claim 1, wherein the head member further comprises a stop member configured to define a stop for a limb that is being cut by the pneumatically powered pole saw.

22. A pneumatically powered pole saw, comprising:
an extendable pole;
a head member secured to the extendable pole;
a cutting blade movably mounted to the head member;
a piston linked to the cutting blade, the piston being slidably received within a piston chamber of the head member;
a reciprocating valve disposed in the head member, the reciprocating valve being configured for movement between a first position and a second position wherein the reciprocating valve releases a portion of a source of compressed gas into the piston chamber on one side of the piston when the reciprocating valve is in the first position causing the cutting blade to move in a first cutting direction towards a limit of travel in the first cutting direction and a first check valve provides fluid communication to the piston chamber on another side of the piston causing the reciprocating valve to move from the first position towards the second position, when the cutting blade reaches the limit of travel in the first direction, the reciprocating valve releases another portion of the source of compressed gas into the piston chamber on the another side of the piston when the reciprocating valve is in the second position causing the cutting blade to move in a second cutting direction opposite to the first cutting direction and towards a limit of travel in the second cutting direction and a second check valve provides fluid communication to the piston chamber on the one side of the piston, the reciprocating valve moving from the second position towards the first position when the cutting blade reaches a limit of travel in the second direction, wherein the reciprocating valve comprises an actuator on either side of the reciprocating valve and a portion of the cutting blade is slidably received on an assembly between a first stop member and a second stop member fixed to the assembly, the assembly being slidably mounted in the head member, wherein contact of the portion of the cutting blade with either the first stop member or the second stop member causes the assembly to move and contact the actuator on either side of the reciprocating valve moving the reciprocating valve between the first position and the second position; and
a stop member depending away from a surface of the head member proximate to a path of travel of the cutting blade.

* * * * *